(12) United States Patent
Gwozdz et al.

(10) Patent No.: US 7,836,458 B1
(45) Date of Patent: Nov. 16, 2010

(54) CONFIGURATION SYSTEM

(75) Inventors: Kazimierz K. Gwozdz, Dublin, CA (US); Marcus Jon Jager, Boulder Creek, CA (US); Durgesh Srivastava, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 1621 days.

(21) Appl. No.: 10/891,543

(22) Filed: Jul. 15, 2004

Related U.S. Application Data

(63) Continuation-in-part of application No. 09/704,625, filed on Nov. 2, 2000, now Pat. No. 6,976,063.

(60) Provisional application No. 60/541,387, filed on Feb. 2, 2004.

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/320; 717/174; 709/221

(58) Field of Classification Search ............... 719/310, 719/320; 709/221, 231; 717/174
See application file for complete search history.

(56) References Cited

U.S. PATENT DOCUMENTS

| | | | | |
|---|---|---|---|---|
| 5,696,975 A * | 12/1997 | Moore et al. | ................. | 717/168 |
| 6,237,092 B1 * | 5/2001 | Hayes, Jr. | ................... | 713/100 |
| 6,324,578 B1 * | 11/2001 | Cox et al. | .................... | 709/223 |
| 6,430,609 B1 * | 8/2002 | Dewhurst et al. | ........... | 709/220 |
| 6,871,221 B1 * | 3/2005 | Styles | ........................ | 709/221 |
| 7,430,187 B2 * | 9/2008 | Holt et al. | .................... | 370/329 |
| 2001/0037399 A1 * | 11/2001 | Eylon et al. | ................. | 709/231 |
| 2002/0147972 A1 * | 10/2002 | Olmeda et al. | ............. | 717/174 |
| 2003/0182460 A1 * | 9/2003 | Khare | ........................ | 709/310 |

OTHER PUBLICATIONS

Wille, Presenting C#, Sams Publishing, Jul. 2000, pp. 15-16,151-162.*

* cited by examiner

*Primary Examiner*—Diem K Cao
(74) *Attorney, Agent, or Firm*—Lee & Hayes, PLLC

(57) ABSTRACT

A configuration system is described. In an implementation, a method includes determining through execution of a configuration system whether an application qualifies as a member of one or more of a plurality of groups. Each of the groups defines one or more criteria for membership and has at least one corresponding block having configuration data. The determining is performed based on whether the application satisfies the one or more criteria. For each of the groups, of which, the application qualifies as a member, the configuration data of the at least one corresponding block is loaded.

34 Claims, 7 Drawing Sheets

CONFIGURATION SYSTEM

RELATED APPLICATIONS

This application claims priority under 35 U.S.C. §119(e) to U.S. Provisional Application No. 60/541,387, filed Feb. 2, 2004 and claims priority under 35 U.S.C. §120 as a continuation-in-part of U.S. patent application Ser. No. 09/704,625, filed Nov. 2, 2000, both of which are incorporated herein by reference in their entirety.

TECHNICAL FIELD

The present invention generally relates to configuration data and more particularly relates to a configuration system suitable for providing configuration data to applications that are executed in a variety of contexts.

BACKGROUND

An application may be executed in a wide variety of contexts to provide desired functionality to a user. The application, for instance, may be executed on a wide variety of computing devices, each being implemented to provide different functionality in different settings, such as a set-top box, a laptop computer, a personal digital assistant (PDA), a tablet personal computer (PC), and so forth. Additionally, the computing device may execute the application such that it communicates with another application that is executed on another computing device that provides a context to the application, such as a browser that communicates with a web application that provides a web page for output by the browser. In another instance, the application may be configured for use by servers arranged as a server "farm". The application, for example, may be executed by each server in a server farm to respond to web page requests by providing the desired web page.

Because of the wide variety of computing devices that may execute the application and the wide variety of functionality that may be provided by the computing devices, the application may encounter a wide variety of execution contexts. An execution context may be thought of as circumstances and conditions which contain the execution of the application, such as the hardware and/or software resources available to the application when it is executed, where the application is executed (e.g., network address), network resources of a computing device that executes the application, and so on. For example, each of the servers in the server farm may provide a different execution context for execution of the application, such as by having differing amounts of processing and memory resources, different network addresses, different device drivers, and so on. Additionally, each computing device that communicates with the application when executed in a server farm may have a different execution context.

Previously, each computing device was supplied with a particular configuration file that included configuration data which was specific for that computing device. For example, in the previously described server farm scenario, each server having a particular execution context (e.g., particular hardware and software resources) was provided with a corresponding configuration file that contained configuration data that was specific for that execution context, such as a configuration file having configuration data for a particular address for purposes of load balancing. Therefore, each new server that was added to the server farm that had a different execution context required a new configuration file, which was both time consuming to develop and inefficient to implement. For example to make a change to the application for execution in a new execution context, a software developer was forced to modify each configuration file to implement the desired change.

Accordingly, there is a continuing need for a configuration system that can provide configuration data to applications for execution in different contexts.

SUMMARY

A configuration system is described. The configuration system, when executed, provides access to configuration data by an application that may be based on the execution context of the application. In an implementation, the configuration system includes a configuration compiler that may be utilized during a build process of the application to generate custom runtime code for accessing configuration data from the configuration system. In another implementation, the configuration system includes a configuration runtime that provides access to configuration data during the execution of the application. The access to the configuration data may be provided during the initialization of the application and/or dynamically during the execution of the application. For example, the custom runtime code generated by the configuration compiler may be utilized to access configuration data contained in a configuration file when the application is initialized. The custom runtime code may also be utilized to update the configuration data utilized by the application due to execution context changes that are encountered during the execution of the application.

In a further implementation, the configuration system locates one or more particular subsets of the configuration data from one or more configuration files that pertain to the application based on the execution context of the application. For example, the configuration file may include a plurality of groups and a plurality of blocks. Each of the groups corresponds, respectively, to at least one of the blocks. For instance, each block may identify a group, to which, it belongs. A given group may have multiple blocks corresponding to different subsets of the configuration data. The configuration data, for example may be split into two files, one containing webserver configuration data and the other containing mailserver configuration data. Both files, however, might have blocks for a live site group and a test lab group.

Additionally, each of the blocks contains a subset of the configuration data. At least one of the groups is "conditional" in that it includes one or more criteria for membership of the application. The configuration runtime, when executed, compares a selector which specifies a property in the execution context of the application with the criteria to find a match. The matches are utilized to determine a list of group memberships for the particular execution context. For each group membership, for instance, the subset of the configuration data of the corresponding block(s) is loaded for communication to the application. In this way, one or more configuration files may be provided for use in configuring the application for execution in a variety of contexts.

BRIEF DESCRIPTION OF THE DRAWINGS

The same numbers are used in instances of the disclosure and figures to reference like components and features.

DETAILED DESCRIPTION

Overview

Figure 1:
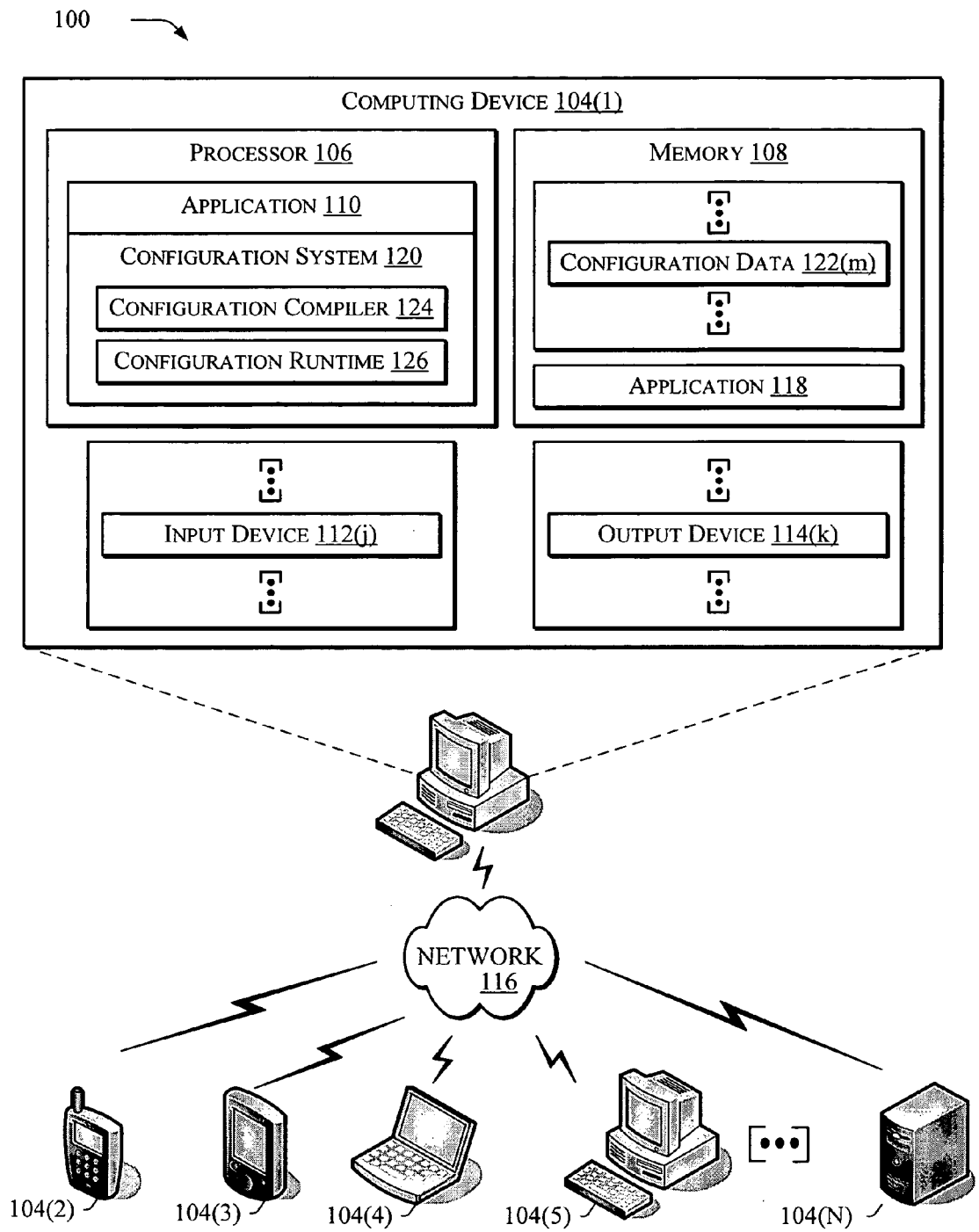
FIG. 1 is an illustration of an environment in an exemplary implementation that employs a configuration system.

A configuration system is described. The configuration system, when executed, provides access to configuration data by an application that may be based on the execution context of the application. The configuration data may be utilized by the application in a variety of ways, such as to configure the application itself for a specific context, to supply data for processing by the application in the specific execution context, and so on.

In an implementation, the configuration system includes a configuration compiler that may be utilized during a build process of the application to generate custom runtime code for accessing configuration data from the configuration system. For example, the configuration compiler, when executed, may generate custom runtime code that, when executed by the application, calls the configuration system to access configuration data. The call to the configuration system may be configured by the custom runtime code such that a specific configuration property is called and an argument is supplied that is utilized as an input to select a particular subset of configuration data. The argument that is supplied may include a property of an execution context of the application.

The configuration system may also include a configuration runtime that provides access to configuration data during an execution of the application. The access to the configuration data may be provided during the initialization of the application and/or dynamically during the execution of the application. Continuing with the previous example, the configuration runtime may be executed for locating one or more particular subsets of the configuration data that pertain to the application based on the execution context of the application. A configuration file, for instance, may be arranged into a plurality of groups and a plurality of blocks. Each of the groups corresponds, respectively, to one of the blocks, each of which containing a subset of the configuration data. At least one of the groups is "conditional" such that it includes one or more criteria for membership of the application. The configuration runtime, when executed, compares a property in the execution context of the application with the criteria to find a match. Each match is utilized to determine a list of group memberships for the particular execution context. The property may be provided by the application and/or the configuration runtime by monitoring the execution of the application. For each match, the subset of the configuration data of the corresponding block is obtained for communication to the application. In another aspect, default configuration data may be provided for selectors which do not have a match. In this way, one or more configuration files may be provided for use in configuration the application for execution in a variety of contexts.

In the following discussion, a glossary of terms is first provided, which is then followed by a description of an environment suitable for employing the configuration system that is described in relation to FIGS. 1-4. Detailed description of the configuration system in the described environment and procedures that may be executed therein is then described in relation to FIGS. 5-9. For purposes of the following discussion, the terms "computing device" and "machine" are synonymous.

Glossary of Terms

The following terms are defined as follows for purposes of the following description.

Module

A module is an independent unit containing a subset of configuration data. Each module defines its own schema, which contains definitions and layout of properties contained in the module.

Configuration File

A configuration file is a data file that contains configuration data, such as configuration properties and their respective values. The configuration file is used during the execution of an application by a configuration runtime.

Include

Include is a directive which is defined in a configuration file and which refers to another configuration file that may be requested by the application. The content of the referenced configuration file replaces the include element in the configuration file during runtime.

Selectors

Selectors are special properties (i.e., settings) that are set by an application and are used as an input by the configuration system to determine the application's configuration data. A selector can include a variety of properties, such as machine IP, build type, user domain, application name, and so on. The collection of selectors, therefore, define the execution context.

Query

A query is a criterion which an application meets in order to become a member of a respective group. For example, a query might include a listing of network addresses that is utilized to define membership in a particular group. If the application is executed on a computing device having one of the network addresses included in the listing, the application is a member of the respective group.

Match

A match is a basic statement used in a query that defines a configuration selector evaluation expression. For example, a match may utilize a Boolean expression to evaluate whether the application is a member of a particular group.

Groups

Groups define membership of applications. Membership is defined in the configuration file and used to selectively load configuration data of an application. A query is defined in the group to evaluate the membership of an application. An application which satisfies the query defined in the group is said to be a member of that group as previously described.

Blocks

Blocks contain configuration data and are defined in a configuration file. Blocks are partitioned based on a group criteria which specifies a particular group, to which, that particular block is associated. An application loads the blocks whose respective groups include the application, i.e. groups whose members include the application. A block without a group attribute may contain default configuration data for the application.

Environment

FIG. 1 is an illustration of an environment 100 in an exemplary implementation that may employ a configuration system. The environment 100 includes a plurality of computing devices 104(1)-104(N). Each of the computing devices 104(1)-104(N) may be configured in a variety of ways. For example, computing device 104(1), as illustrated, is configured as a desktop PC. Computing device 104(2) is illustrated as a wireless phone, computing device 104(3) is illustrated as a tablet PC, computing device 104(4) is illustrated as a notebook computer, and computing device 104(N) is illustrated as a server. Computing devices may also assume a variety of other configurations, such as a mobile station, an entertainment appliance, a set-top box communicatively coupled to a display device, a video game console, a PDA, and so forth. Thus, the plurality of computing devices 104(1)-104(N) may range from a full resource device with substantial memory and processor resources (e.g., PCs, television recorders equipped with hard disk) to a low-resource device with limited memory and/or processing resources (e.g., a traditional set-top box).

Because of the wide variety of configurations that the plurality of computing devices 104(1)-104(N) may assume, each of the computing devices may provide different execution contexts, one to another, for an application. As previously described, the execution context may be thought of as circumstances and conditions which contain the execution of the application. For example, each of the plurality of computing devices includes a processor and memory, such as the processor 106 and memory 108 that are illustrated as included on computing device 104(1). The processor and memory resources of each of the computing devices, however, may be different due to the different configurations. For instance, computing device 104(1) which is illustrated as a desktop PC may include a greater amount of processor and memory resources than those included on computing device 104(4) which is illustrated as a notebook computer. Therefore, the processing and memory resources utilizing in the execution of application 110 on computing device 104(1) provide a different execution context than that which is encountered by an application that is executed on computed device 104(4) which has a lesser amount of processing and memory resources.

A wide variety of other properties may also provide an execution context to the application 110. For example computing device 104(1) may include a plurality of input devices 112(j), where "j" can be any integer from one to "J". Each of the input devices 112(j) may be configured in a variety of ways, such as to provide user interaction, to provide an input of content, and so on. Computing device 104(1) may also include a plurality of output devices 114(k), where "k" can be any integer from one to "K" which may also be configured in a variety of ways, such as to output video for viewing by a user. Although the plurality of input and output devices 112(j), 114(k) are illustrated separately, one or more of the input and output devices 112(j), 114(k) may be combined into a single device, such as a television having buttons for input, a display device, and a speaker. The plurality of input and output devices 112(j), 114(k) may be utilized in the execution of the application 110 and therefore provide an execution context to the application 110.

A network 116 that is communicatively coupled to the computing devices 104(1) which executes the application 110 may also provide an execution context to the application 110. Computing device 104(1), for instance, is communicatively coupled to a network 116. The network 116 is illustrated as the Internet, and may include a variety of other networks, such as an intranet, a wired or wireless telephone network, a broadcast network, and other wide or local area networks. The network location of the computing device 104(1), for instance, may provide an execution context for the application 110 such that different configuration values may be provided based on the network location, further description of which may be found in relation to FIG. 5.

The computing device 104(1) may also utilize the network 116 to access additional functionality that may provide an execution context to the application 110. For example, the computing device 104(1) may be communicatively coupled over the network 116 to one or more remote computing devices (e.g., computing devices 104(2)-104(N) such that the remote computing device may provide content to the computing device 104(1). For example, computing device 104(N) may stream content over the network 116 for processing by the application 110, and therefore provide an execution context to the application 110.

Additionally, another application 118, when executed on a computing device 104(1), may provide an execution context to the application 110. Application 118, for instance, is illustrated as stored in the memory 108 and is executable on the processor 106. Application 110 is illustrated as being executed on the processor 106 and is storable in the memory 108. Application 118, when executed in conjunction with application 110, may provide data to the application 110, accept data from the application 118, and so forth, and therefore provide an execution context to the application 110. For example, application 118 may be executed to provide content, such as documents, spreadsheets, video, audio, and so on, to the application 110 for processing by the application 110. Additionally, the application 118 may be configured to provide content interaction, such as encoding, editing, and/or playback of the content that is processed by the application 110.

The application 110, when executed, may also be configured for use by multiple users. The application 110, for instance, may be configured as a server application that is executed on the computing device 104(1) for being accessed over the network 116 by a plurality of users (e.g., the other computing device 104(2)-104(N)). Each of the users has a respective thread in the execution of the application 110. A thread includes data associated with a single use of the application 110 which is utilized to serve a particular one of the users and/or a particular service request. Therefore, when the plurality of users (e.g., the other computing device 104(2)-104(N)) access the application 110, a thread is created and maintained for each user. Thread data may be stored in a particular area of the memory 108. Thus, the application 110 may encounter a plurality of execution contexts even when executed on a single computing device (e.g., computing device 104(1)). Further discussion of threads may be found in relation to FIG. 7. Although a variety of properties that provide an execution context to the application 110 have been described, a variety of other properties are also contemplated.

A configuration system 120 may be employed to enable the application 110 to be executed in the wide variety of execution contexts and/or to provide execution context specific configuration data. For example, the configuration system 120, when executed, provides configuration data to the application 110 based on the execution of the application 110 in the variety of contexts, enables the application 110 to switch between execution contexts when executed on a single computing device (e.g., when the application 110 is a server application), and so on. The configuration system 120 is illustrated as being executed on the processor 106 and is storable in the memory 108. The configuration system 120, when executed, provides an application programming interface (API) such that the application 110 may access a plurality of configuration data 122(*m*), where "m" can be any integer from one to "M". Further discussion of configuration system 120 APIs may be found in relation to FIGS. 2, 8 and 9.

The configuration system 120 includes a configuration compiler 124 and a configuration runtime 126. The configuration compiler 124 is utilized during a build process of the application 110 to generate code that provides access to the configuration data 122(*m*). Further discussion of execution of the configuration compiler 124 may be found in relation to FIGS. 2 and 5. The configuration runtime 126, when executed, provides configuration access to the configuration data 122(*m*) during execution of the application 110. Further discussion of execution of the configuration runtime 126 may be found in relation to FIGS. 2, 6 and 7.

Figure 2:
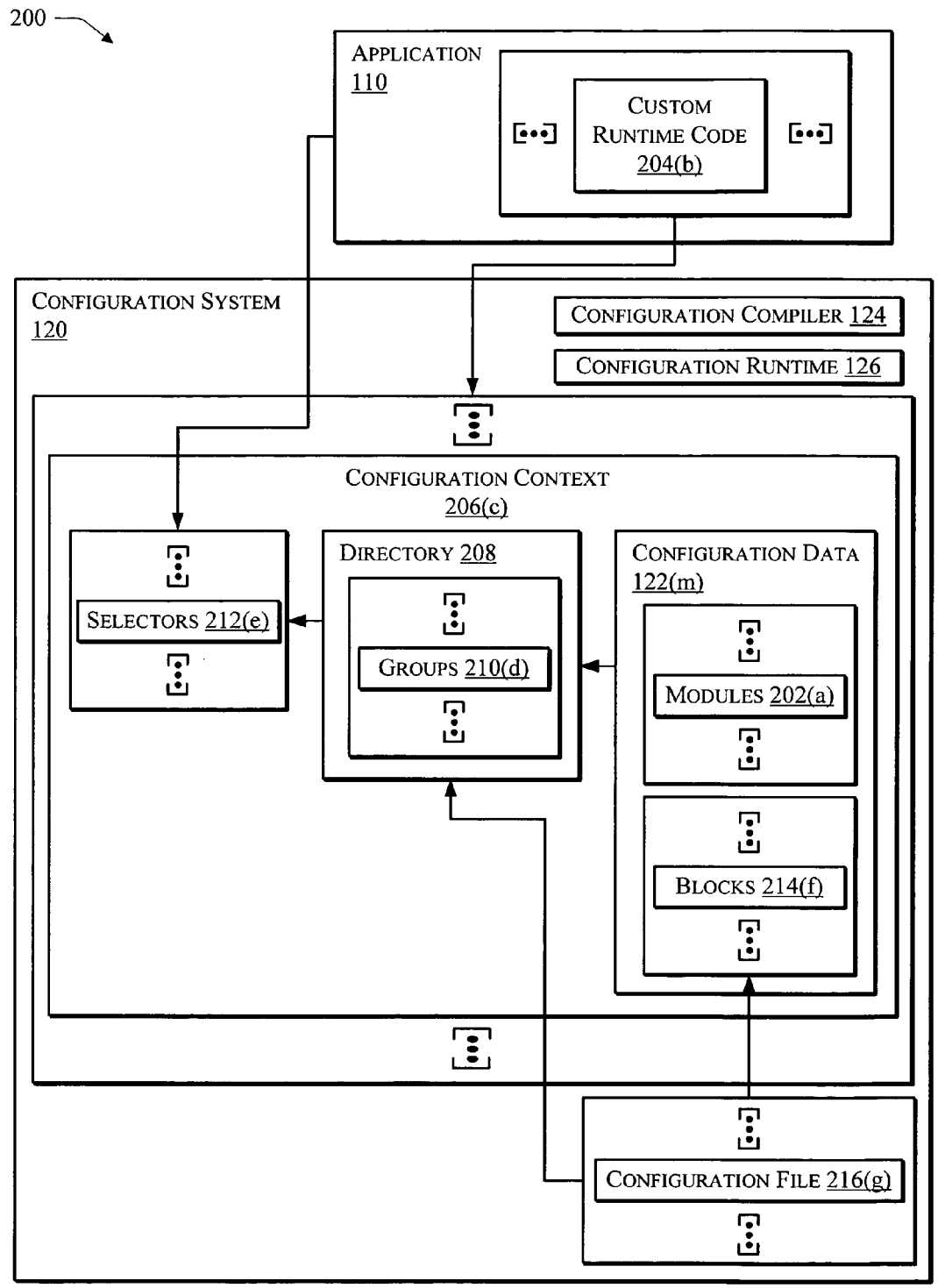
FIG. 2 is an illustration of a system in an exemplary implementation in which the configuration system and an application of FIG. 1 are shown in greater detail.

FIG. 2 is an illustration of a system 200 in an exemplary implementation in which the configuration system 120 and the application 110 of FIG. 1 are shown in greater detail. In an embodiment, the configuration system 120 exposes one or more APIs that can be called by the application 110 to access the configuration data 122(*m*) of FIG. 1. The APIs may be called by the application 110 without having to "know" the details (e.g., criteria for selection of particular subsets of configuration data, configuration data values, and so forth) of how the configuration data 122(*m*) was provided. For example, the configuration system 120 may be thought of as existing at an "infrastructure" level of software that is executed on the computing device 140(1) of FIG. 1. In other words, the configuration system 120 is a software layer used by the application 110 to interact with the configuration data 122(*m*). Thus, the configuration system 120 may be utilized such that the application 110 does not have to implement separate code for each execution context that may be encountered by the application 110. In this way, the configuration system 120 provides a set of reusable software components that may be executed to provide configuration data 122(*m*) to one or more applications for execution in a wide variety of execution contexts. Further discussion of APIs of the configuration system 120 may be found in relation to FIGS. 8 and 9.

The configuration system 120 includes a plurality of modules 202(*a*), where "a" can be any integer from one to "A". Each of the plurality of modules 202(*a*) is an independent unit containing a subset of the configuration data 122(*m*) of FIG. 1. Each module 202(*a*) defines its own schema, which contains definitions and provides a layout of the configuration data addressed by the module 202(*a*). For example, the application 110 may define its own structure of configuration data and partition the structure into independent modules. Further discussion of the modules 202(*a*) may be found in relation to FIG. 3.

For each module 202(*a*), the configuration compiler 124 is executed to generate custom runtime code 204(*b*), where "b" can be any integer from one to "B". The application 110 utilizes the custom runtime code 204(*b*) to access the configuration data 122(*m*) of FIG. 1. For instance, the custom runtime code 204(*b*) that is generated enables the application 110 to call corresponding modules 202(*a*) having a subset of the configuration data 122(*m*) of FIG. 1.

The application 110 accesses the modules 202(*a*) and the corresponding configuration data 122(*m*) through one or more configuration context objects 206(*c*) (hereinafter referred to as a "configuration context"), where "c" can be any integer from one to "C". A configuration context 206(*c*) is created independently for each executing application thread. For example, the application 110, as previously described, may be configured as a server application for access by a plurality of users. A thread is created for each user having data that describes that user's execution context.

Configuration data 122(*m*) included in the configuration context 206(*c*) for a particular thread is selected through use of a directory 208. The directory 208 includes a plurality of groups 210(*d*), where "d" can be any integer from one to "D", having corresponding criteria for membership. Membership is used to selectively load conditional configuration data for a specific application, and more particular for a particular execution context of the particular application. A query is defined in the group to evaluate the membership of an application based on the criteria, such as IP address of the computing device 104(1) of FIG. 1 that executes the application 110. If the application 110 satisfies the criteria defined in the group, the application 110 is a member of that group.

The properties for membership to particular groups 210(*d*) may be provided by the application 110 through the use of one or more of a plurality of selectors 212(*e*), where "e" can be any integer from one to "E", which is illustrated in FIG. 2 by the arrow from the application 110 to the selectors 212(*e*). Each selector 212(*e*) may be considered as a special property which is used to differentiate between execution contexts by the configuration runtime 126 when selecting conditional configuration data for a particular application, e.g. application 110. Comparison of the selectors 212(*e*) with criteria defined in the groups 210(*d*) is further described in relation to FIG. 6.

Each of the groups 210(*d*) has a corresponding subset of configuration data 122(*m*) that is partitioned into one or more of a plurality of blocks 214(*f*), where "f" can be any integer from one to "F". Each of the plurality of blocks 214(*f*), for instance, may be partitioned based on a common attribute which specifies a particular group 210(*d*), to which, that particular block 214(*f*) is associated. Therefore, after membership of the application 110 in one or more of the plurality of groups 210(*d*) has been determined, corresponding subset(s) of the configuration data may be obtained by loading one or more of a plurality of blocks 214(*f*) that correspond to the one or more groups 210(*d*), of which, the application 110 is determined to be a member. A block without a group attribute may contain default configuration data values for the application 110.

The modules 202(*a*), groups 210(*d*), and blocks 214(*f*) are obtained from one or more configuration files 216(*g*), where "g" can be any integer from one to "G". Through use of groups 210(*d*) and blocks 214(*f*), the configuration file 216(*g*) may supply a variety of configuration data to the application 110 based on the execution context of the application 110. In this way, the configuration file(s) 216(*g*) may be "generic" such that configuration files(s) 216(*g*) may be utilized to supply configuration data for a wide variety of execution contexts without having to write a particular configuration file for each particular configuration context. Further discussion of the configuration file 216(*g*) may be found in relation to FIG. 4.

Figure 3:
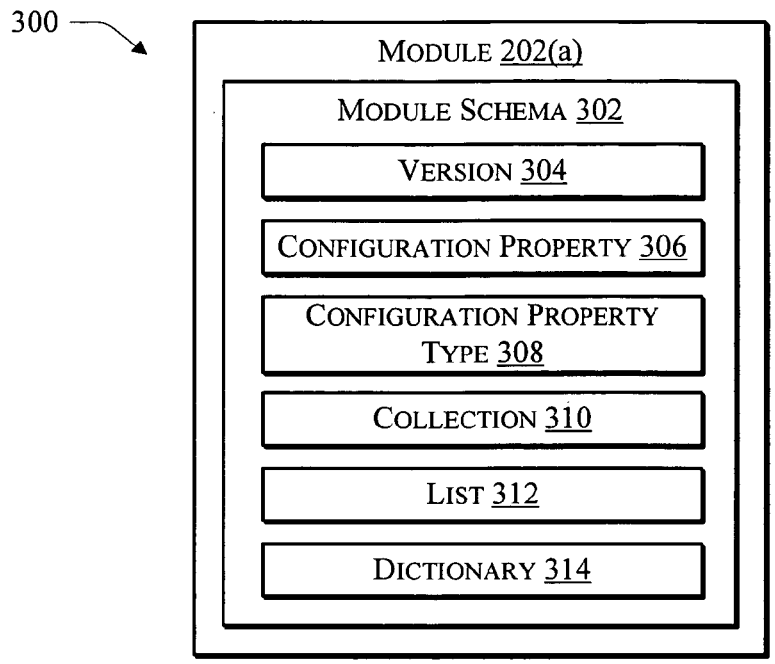
FIG. 3 is an illustration of an exemplary implementation showing a module of FIG. 2 in greater detail.

FIG. 3 is an illustration of an exemplary implementation 300 showing the module 202(*a*) of FIG. 2 in greater detail. As previously described, the module 202(a) is an independent unit containing a subset of configuration data 122(m) of FIG. 1. Each module 202(a) defines its own module schema 302, which contains definitions and layout of each of the configuration properties contained in the module. Each module 202(a) may be handled independently by the configuration runtime 126 of FIGS. 1 and 2, even when multiple modules are present in a single configuration file 216(g) of FIG. 2. Applications typically define the module's 202(a) structure in a way that corresponds to the application's architecture.

The module's 202(a) configuration data may be defined in more than one of the blocks 214(f) and/or more than one the configuration files 216(g) of FIG. 2. Additionally, as previously described, some of those blocks 214(f) of FIG. 2 may be included conditionally, based on a group 210(d) membership evaluation. All relevant blocks are merged into a final data set when the module 202(a) is accessed by the application 110 of FIG. 2. The final data set may be utilized in the execution of the application 110 in a variety of ways, such as to configure the application itself for a particular execution context, to provide specific data for output in a particular execution context, and so forth. Although components of the module 202(a) are illustrated separately, one or more of the components may be combined and/or further separated. The following discussion of the components of the module 202(a) shown in the exemplary implementation 300 of FIG. 3 will be described in relation to the system 200 of FIG. 2.

Module Schema 302

The module schema 302 may be defined in a variety of ways, such as through a restricted eXtensible Markup Language (XML) Schema Definition (XSD). The application 110 may define one or more modules 202(a), and may also use modules 202(a) defined by external components. Each module 202(a), for instance, defines its module schema 302 in a separate XSD file, which becomes an input to the configuration compiler 124 of FIG. 2. The configuration compiler 124 utilizes the module schema 302 to generate a corresponding configuration class, which is used by the application 110 to access the configuration data 122(m).

The following informal XSD module schema 302 shows a sample module 202(a) definition that illustrates exemplary constructs provided by this configuration implementation:

```
<?xml version="1.0" encoding="utf-8" ?>
<xsd:schema xmlns:xsd="http://www.w3.org/2001/XMLSchema"
xmlns="TestConfig.xsd"
            targetNamespace="TestConfig.xsd" elementFormDefault=
            "qualified" version="">
  <xsd:include schemaLocation="" />
  <xsd:element name="">
    <xsd:annotation>
      <xsd:documentation>Config module</xsd:documentation>
    </xsd:annotation>
    <xsd:complexType>
      <xsd:sequence>
        <xsd:element name="" type="">
          <xsd:annotation>
            <xsd:documentation>Single property</xsd:documentation>
          </xsd:annotation>
        </xsd:element>
        <xsd:element name="" type="" default="">
          <xsd:annotation>
            <xsd:documentation>Single property with default
            </xsd:documentation>
          </xsd:annotation>
        </xsd:element>
        <xsd:element name="" type="" minOccurs="" maxOccurs="">
          <xsd:annotation>
            <xsd:documentation>Property list</xsd:documentation>
```

-continued

```
          </xsd:annotation>
        </xsd:element>
        <xsd:element name="" minOccurs="" maxOccurs="">
          <xsd:annotation>
            <xsd:documentation>Property dictionary</xsd:
            documentation>
          </xsd:annotation>
          <xsd:complexType>
            <xsd:simpleContent>
              <xsd:extension base="">
                <xsd:attribute name="" type="" use="required" />
              </xsd:extension>
            </xsd:simpleContent>
          </xsd:complexType>
        </xsd:element>
        <xsd:element name="">
          <xsd:annotation>
            <xsd:documentation>Single collection</xsd:documentation>
          </xsd:annotation>
          <xsd:complexType>
            <xsd:sequence>
              <!-- collection items defined here -->
            </xsd:sequence>
          </xsd:complexType>
        </xsd:element>
        <xsd:element name="" minOccurs="" maxOccurs="">
          <xsd:annotation>
            <xsd:documentation>Collection list</xsd:documentation>
          </xsd:annotation>
          <xsd:complexType>
            <xsd:sequence>
              <!-- collection items defined here -->
            </xsd:sequence>
          </xsd:complexType>
        </xsd:element>
        <xsd:element name="" minOccurs="" maxOccurs="">
          <xsd:annotation>
            <xsd:documentation>Collection dictionary
            </xsd:documentation>
          </xsd:annotation>
          <xsd:complexType>
            <xsd:sequence>
              <!-- collection items defined here -->
            </xsd:sequence>
            <xsd:attribute name="" type="" use="required" />
          </xsd:complexType>
        </xsd:element>
      </xsd:sequence>
    </xsd:complexType>
  </xsd:element>
</xsd:schema>
```

Version 304

Version 304 is an attribute that should contain a valid version-type value. The configuration runtime 126 automatically registers a constant selector (containing this value) under a name "{Module}_ConfigVersion", where {Module} is the name of the module's 202(a) top element.

Data Items

The following sections describe in greater detail an example of how to define the exemplary module schema 302 constructs shown above.

Configuration Property 306

A single configuration property may be defined in the module schema 302 as follows:

```
<xsd:element name="" type="" minOccurs="1" maxOccurs="1">
  <xsd:annotation>
    <xsd:documentation></xsd:documentation>
  </xsd: annotation>
</xsd: element>
```

Both minOccurs and maxOccurs attributes may be omitted. Optionally, the configuration property 306 may have a default value defined, in the following scenario minOccurs has an implied value of zero:

```
<xsd:element name="" type="" minOccurs="0" maxOccurs="1" default="">
<xsd:annotation>
<xsd:documentation></xsd:documentation>
</xsd:annotation>
</xsd:element>
```

The configuration property 306 is represented as simple elements in the configuration file 216(g). The following is an example of a configuration property 306 named Aaa containing the value xyz:

```
<Aaa>xyz</Aaa>
```

Configuration Property Type 308

A configuration property type 308 may utilize one or more simple and defined XSD types. Optionally, each element that uses a configuration property type 308 may define its own value restrictions, as shown in the following example:

```
<xsd:element name="">
<xsd:annotation>
<xsd:documentation></xsd:documentation>
</xsd:annotation>
<xsd:restriction base="">
<xsd:minExclusive value=""/>0 . . . 1
<xsd:maxExclusive value=""/>0 . . . 1
<xsd:minInclusive value=""/>0 . . . 1
<xsd:maxInclusive value=""/>0 . . . 1
<xsd:minLength value=""/>0 . . . 1
<xsd:maxLength value=""/>0 . . . 1
<xsd:enumeration value=""/>0 . . . n
</xsd:restriction>
</xsd:element>
```

A variety of constraints may apply when using the above restrictions. For example, an enumeration restriction may be mutually exclusive with all other restrictions, i.e. no other restrictions may be defined if one or more enumeration elements is present. In another example, to use any of the value range restrictions, base configuration property type 308 implements a System.IComparable interface. To use value length restrictions, the type implements a public Length property of type System.Int32.

Collection 310

A collection 310 is a container-type element, which is used to define hierarchical configuration data 122(m) structures. The collection 310 may contain configuration properties 306 and/or other collections. In an implementation, there are no restrictions on how "deep" collections can be nested, i.e. the number of hierarchical layers that may be included in the collection 310. An example of the collection 310 may be defined as shown in the following example:

```
<xsd:element name="">
<xsd:annotation>
<xsd:documentation></xsd:documentation>
</xsd:annotation>
<xsd:complexType>
<xsd:sequence>
<!—collection items defined here—>
</xsd:sequence>
</xsd:complexType>
</xsd:element>
```

The collection 310 is represented as a parent element in the configuration file 216(g). In the following example, Eee is the collection 310 containing the configuration property 306 Ppp and another collection Hhh which is nested within the collection 310 Eee:

```
<Eee>
<Ppp>xyz</Ppp>
<Hhh>
<Qqq>mm</Qqq>
<Rrr>nn</Rrr>
</Hhh>
</Eee>
```

List 312

If a data element (i.e., the configuration property 306 or the collection 310) has maxOccurs value defined as greater then 1, than the data element becomes a list 312, an example of which is represented as follows:

```
<xsd:element name="" type="" minOccurs="0" maxOccurs="unbounded">
<xsd:annotation>
<xsd:documentation></xsd:documentation>
</xsd:annotation>
</xsd:element>
```

In an implementation, duplicate values in the list 312 are ignored. Applications may retrieve list 312 items by using a zero-based index.

Dictionary 314

A dictionary 314 is a list of data elements (e.g., configuration property 306 or collection 310) indexed with an additional attribute, which is referred to as a "key". Configuration properties 306 and/or collections 310 may define the key attribute in the dictionary 314 differently. The following is a first example of how to define the dictionary 314 of a configuration property 306:

```
<xsd:element name="" minOccurs="0" maxOccurs="unbounded">
<xsd:annotation>
  <xsd:documentation></xsd:documentation>
</xsd:annotation>
<xsd:complexType>
  <xsd:simpleContent>
    <xsd:extension base="">
      <xsd:attribute name="" type="" use="required"/>
    </xsd:extension>
  </xsd:simpleContent>
</xsd:complexType>
</xsd:element>
```

A dictionary 314 for a collection 310 may also be defined as shown in the following example:

```
<xsd:element name="" minOccurs="0" maxOccurs="unbounded">
<xsd:annotation>
<xsd:documentation></xsd:documentation>
</xsd:annotation>
<xsd:complexType>
<xsd:sequence>
  <!—collection items defined here—>
</xsd:sequence>
<xsd:attribute name="" type="" use="required"/>
</xsd:complexType>
</xsd:element>
```

Figure 5:
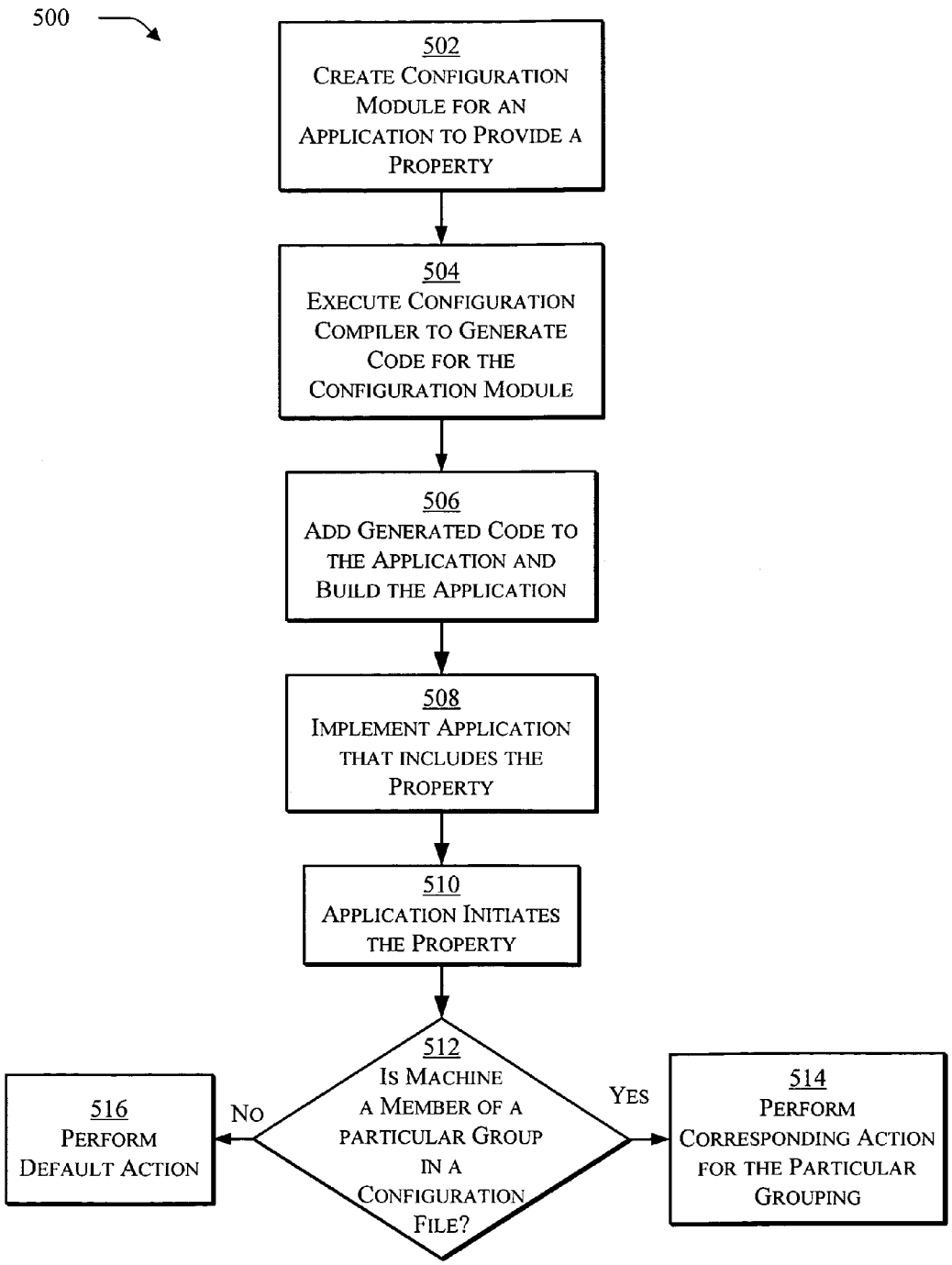
FIG. 5 is a flow diagram depicting a procedure in an exemplary implementation in which a configuration property is created for and implemented by an application.
Figure 6:
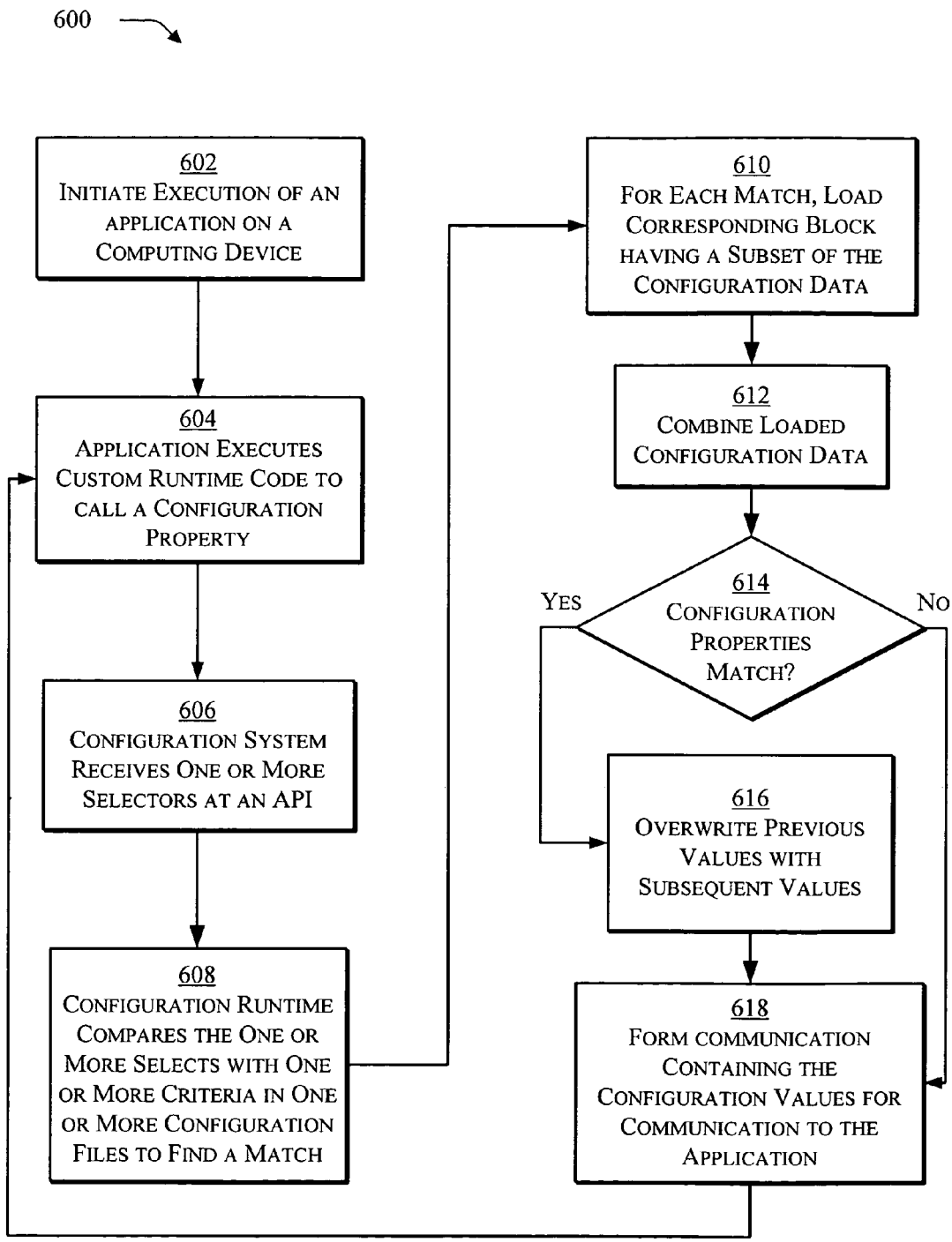
FIG. 6 is a flow diagram depicting a procedure in an exemplary implementation in which a configuration runtime of FIGS. 1 and 2 is executed to provide configuration data to the application of FIG. 5.
Figure 7:
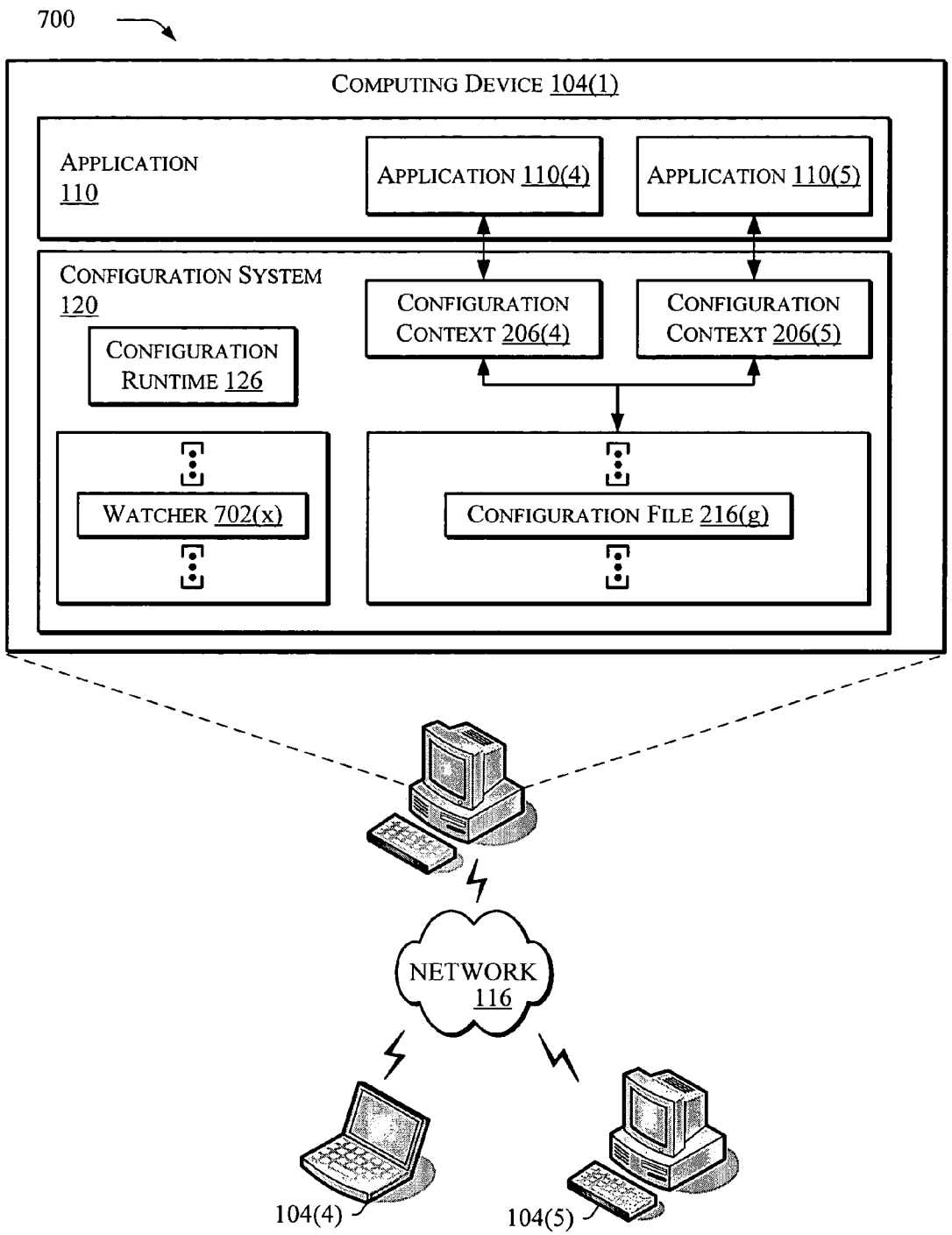
FIG. 7 is an illustration showing a system in an exemplary implementation in which an execution context is changed during the execution of the application of FIG. 1 on the computing device.

The previously described components of the module 202(a) may be utilized by the configuration compiler 124 to configure the application 110 to interact with the configuration data 122(m) through use of the configuration runtime 126, additional discussion of which may be found in relation to FIGS. 5-7.

Figure 4:
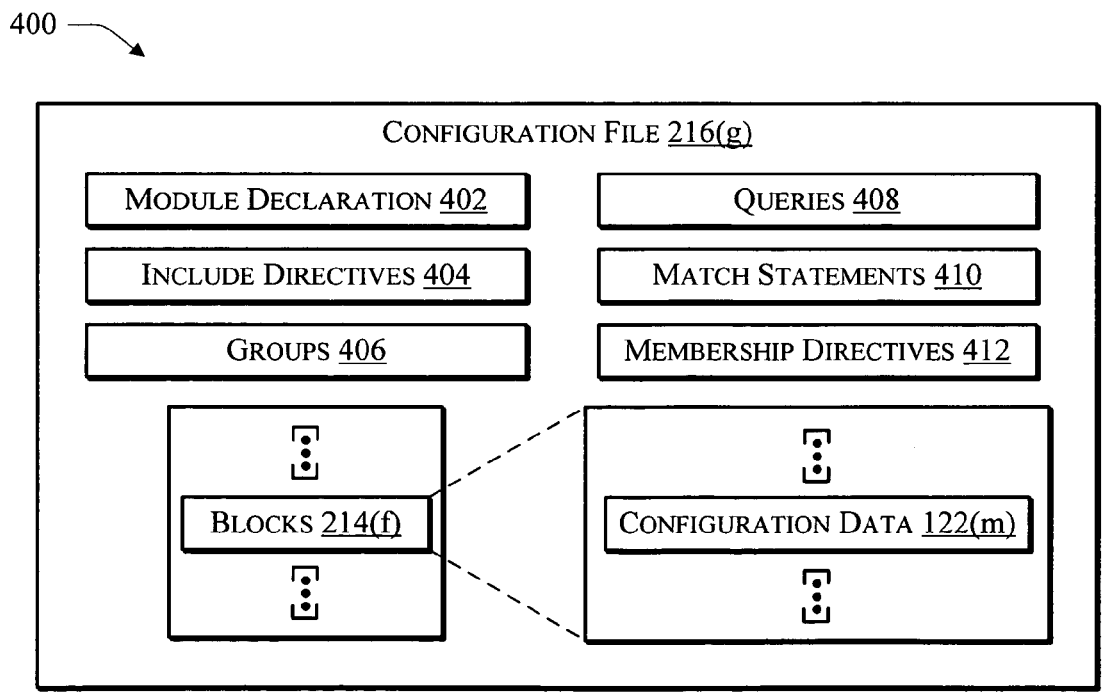
FIG. 4 is an illustration of an exemplary implementation showing a configuration file of FIG. 2 in greater detail.

FIG. 4 is an illustration of an exemplary implementation 400 showing the configuration file 216(*g*) of FIG. 2 in greater detail. The configuration file 216(*g*) arranges a variety of configuration data, such as module declarations (which tell the configuration runtime 126 which of the plurality of modules 202(*a*) the application 110 will use), group definitions (which define conditional access to the configuration data 122(*m*)), blocks 214(*f*) (which contain actual configuration property data), and so on. The following is an example of an informal high-level structure of the configuration file 216(*g*):

```
<?xml version="1.0" encoding="utf-8" ?>
<config xmlns=>
<module/>0 . . . n
<include/>0 . . . n
<include group=""/>0 . . . n
<group name=""/>0 . . . n
<block/>0 . . . n
<block group=""/>0 . . . n
</config>
```

Module Declaration 402

Each module 202(*a*) accessed by the application is declared. In an implementation, the placement and order, however, in which module elements appear is irrelevant. If a specified module's assembly is not found, or the class specified cannot be loaded from the assembly, configuration load fails.

The module declaration 402 declares a module class name generated by the configuration compiler 124 to the configuration runtime 126. This declaration enables the configuration runtime 126 to load the module's 202(*a*) data. In an implementation, the class is declared by using .NET (.NET is a trademark of the Microsoft Corp., Redmond, Wash.) assembly-qualified class name, for example:

```
<module>MyCompany.MyProduct.AbcConfig, MyProductConfig, Version=1.1.0.0,
    Culture=neutral,
        PublicKeyToken=b7cd873adc34e92f</module>
```

In an implementation, if a module 202(*a*) is shared by multiple applications using different versions of the module 202(*a*), the module declaration 402 is not a part of a shared data file, thereby allowing each application to declare the appropriate module class version.

Include Directive 404

An include directive 404 is used to include other configuration files of the plurality of configuration files 216(*g*). The configuration data 122(*m*) from the referenced configuration file is inserted at the location of the include element in the configuration file 216(*g*) at runtime. An example of the include directive 404 is represented as follows:

```
<include>path</include>
<include group="">path</include>
```

If a relative path is used, it is relative to the current configuration file 216(*g*) that contains the include directive 404.

Optionally, the include directive 404 may be qualified with a group name. In such a case, the include directive 404 is conditional and the configuration file will be included only if the current execution context is a member of the specified group. If the configuration file referenced by the include directive 404 is not found, the configuration load fails.

Groups 406

Groups 406 are used to define membership of applications. Membership, as previously described, is used to selectively load configuration data 122(*m*) for a particular application, such as a particular execution context of the particular application. A group 406 may be considered a notation that utilizes selectors 212(*e*) and is defined in the configuration file 216(*g*). As previously described, selectors 212(*e*) are properties defined by the application 110 which are used to determine the application's membership in one or more of the groups. Examples of selectors may include machine IP address, build type, application version, user domain, and so forth.

Groups 406 are differentiated based on one or more criteria. The configuration runtime 126, when executed, determines which of the groups 406, to which, the application 110 belongs based on the selectors 212(*e*) specified by the application 110 when compared with the criteria of each of the groups 406. For example, when the application 110 supplies a selector that satisfies a query defined in a particular group, the application is said to "belong" to or is a "member" of that particular group. An exemplary informal schema of a group element is represented as follows:

```
<group name="">
<documentation></documentation>1 . . . 1
<query/>0 . . . 1
<memberOf/>0 . . . n
<notMemberOf/>0 . . . n
</group>
```

A group may be identified in the configuration file 216(*g*) by its "name" attribute. In an implementation, each group name is qualified with a namespace, separated by a:' character, for example:

```
<group name="MyApp.:LiveSiteMachines"/>
```

Queries 408

Queries 408, as previously described, are utilized to define membership in a group, an example of which is represented as follows:

```
<query>
<match/>0 . . . n
<notMatch/>0 . . . n
<and>0 . . . n
   <match/>0 . . . n
   <notMatch/>0 . . . n
</and>
</query>
```

As previously described, a query may be thought of as a criterion which the application 110 meets in order to become a member of a respective group. For example, a query might include a listing of network addresses that is utilized to define membership in a particular group. If the application is executed on a computing device that has one of the network addresses included in the listing, the application is a member of the respective group. Statements in a query may be combined using a logical OR operator if the query contains more than one statement at the top level.

Match Statements 410

A match is a basic statement used in a query that defines a configuration selector evaluation expression. For example, match and notMatch are basic query statements that define group membership evaluation expressions. A result of the match statements, for instance, may be true or false. NotMatch is an equivalent of negating the result of a match statement. Match and notMatch may be defined as follows:

```
<match selector="" operator="" valueType="">value</match>
<notMatch selector="" operator="" valueType="">value</notMatch>
```

In an implementation, the operator and valueType attributes shown in the above exemplary code are optional. In another implementation, the default operator is Equal and default value type is the same as the selector's type.

An IsMemberOf operator is used for evaluating conditional memberships in other groups. The IsMemberOf operator may be considered as a way to execute queries defined by other, already defined, groups. For the IsMemberOf operator, the other attributes may be omitted. The following table includes exemplary operators and corresponding argument types:

| Operator | Selector Type | Value Type | Behavior |
|---|---|---|---|
| Null | Any | n/a | Evaluates if selector is null (undefined) |
| Equal | Any | Selector's type | Evaluates to true if the selector is equal to the specified value |
| Less LessEqual Greater GreaterEqual | IComparable | Selector's type | Evaluates the expression: {Selector} operator {Value} |
| Contains | String | String | Evaluates the expression: {Selector} Contains {Value} |
| In | String | String | Evaluates the expression: |
| IsMemberOf | n/a | Value is a group name | Evaluates if current context is member of the specified group |

Membership Directives 412

Membership directives 412 are used to build group hierarchies. In the following exemplary code, MemberOf and notMemberOf are membership directives which are used to build group hierarchies:

```
<group name="Group1"/>
<group name="Group2">
   <query/>
   <memberOf group="Group1"/>
</group>
<group name="Group3">
   <query/>
   <memberOf group="Group1"/>
</group>
<group name="Group4">
   <query/>
   <memberOf group="Group2"/>
   <notMemberOf group="Group1"/>
</group>
```

In the above example, Group1 does not define members on its own, but Group1 contains members of Group2 and Group3. However, Group1 does not contain Group4 because it explicitly declined membership, which would otherwise take place through Group2 membership.

Blocks 214(f)

Each of the blocks 214(f) contains the configuration data values for defined configuration items grouped by modules 202(a). Additionally, the block 214(f) may include a group attribute that specifies a corresponding group 210(d). Following is an exemplary informal schema of a block 214(f):

```
<block>0 . . . n
<Module>0 . . . n
   <ConfigItem/>0 . . . n
</Module>
</block>
<block group="">0 . . . n
<Module>0 . . . n
   <ConfigItem>0 . . . n
</Module>
</block>
```

A block 214(f) without a group attribute is a default block and contains default values for configuration items. In this way, a default may be defined outside of the module schema 302 of FIG. 3 such that a new software release is not required due to changes in the module schema 302.

The configuration runtime 126, when executed, determines all the groups an application is a member of through comparison of the selectors with membership definitions (i.e., queries, criteria) specified in groups. Once the application's membership groups are decided, the corresponding blocks are loaded and configuration data is combined for communication to the application.

In an implementation, the blocks 214(f) are loaded in the order in which the blocks 214(f) appear in the configuration file 216(g). Therefore, if a configuration value appears in more than one of the blocks 214(f) that are loaded, the values from the latter block override the configuration values of the prior block. Further discussion of execution of the configuration runtime 126 may be found in relation to FIGS. 6 and 7.

Exemplary Procedures

The following discussion describes building and execution of an application that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

FIG. 5 is a flow diagram depicting a procedure 500 in an exemplary implementation in which a configuration property (called Greeting) in created for and implemented by an application referred to as HelloApp. At block 502, to define the configuration property Greeting, a configuration module Hello is created for the application in a HelloConfig.xsd file, an example of which is shown as follows:

```
<?xml version="1.0" encoding="utf-8" ?>
<xsd:schema xmlns:xsd="http://www.w3.org/2001/XMLSchema"
xmlns="HelloConfig.xsd"
         targetNamespace="HelloConfig.xsd" elementFormDefault=
         "qualified">
   <xsd:include schemaLocation="/ConfigTypes.xsd" />
   <xsd:element name="Hello">
      <xsd:annotation>
         <xsd:documentation>Hello application configuration</xsd:
         documentation>
      </xsd:annotation>
      <xsd:complexType>
         <xsd:sequence>
            <xsd:element name="Greeting" type="String">
               <xsd:annotation>
                  <xsd:documentation>Greeting text</xsd:documentation>
               </xsd:annotation>
            </xsd:element>
         </xsd:sequence>
      <xsd:complexType>
   </xsd:element>
</xsd:schema>
```

At block 504, the configuration compiler is executed to generate code for the Hello module for implementation by the application, e.g. application 110 of FIG. 2. The configuration compiler generates code for the application that, when executed, provides access to the module's configuration data through use of a configuration context, e.g., configuration context 206(c) of FIG. 2. Thus, the configuration compiler may be used during the development process of the application to generate module-specific runtime code to be included within the application. From a developer's point of view, this approach has several advantages: (1) this approach provides strongly-typed, easy to use configuration data access interface; (2) this approach provides for easy and safe sharing of configuration data between applications; and (3) this approach makes schema changes safe (e.g., changing a name of the property will cause compiler errors in all code that uses this property, instead of waiting until the execution of the application to locate the errors).

The configuration compiler may be implemented as a command line tool that is used during the application build process. The configuration compiler accepts a module schema file as an input and produces one or two source code files at the specified location(s), an example of which is shown as follows:

ConfigCompiler xsdSchemaFile className csManagedCodeFile [hUnmanagedCodeFile]

In the above example, className is a full, namespace-qualified class name, which is generated based on the schema defined in xsdSchemaFile, and csManagedCodeFile contains C# managed configuration access source code for the module. Optionally, applications that require configuration access from unmanaged environments may specify C++ header file hUnmanagedCodeFile, which will cause the configuration compiler to generate unmanaged configuration access source code and COM managed-to-unmanaged interfaces. Further discussion of managed and unmanaged code as utilized by the configuration system may be found in relation to FIGS. 8 and 9.

At block 506, the generated code is added to the application and the application is built. For example, the generated HelloConfig.cs file may be represented as follows:

```
//
// ConfigCompiler-generated file
//
using System;
using System.Net;
using.Common.Config;
namespace.HelloApp
{
/// <summary>
/// Hello application configuration
/// </summary>
public sealed class HelloConfig : ConfigModuleAccess
{
   /// <summary>
   /// Current instance of configuration module 'Hello'
   /// </summary>
   public static HelloConfig Current
   {
      get
      {
         HelloConfig current =(HelloConfig)ConfigModuleAccess.GetCurrent(typeof(HelloConfig));
         if (current == null)
         {
            current = new HelloConfig( );
            ConfigModuleAccess.SetCurrent(current);
         }
         return current;
      }
   }
   /// <summary>
   /// Greeting text
   /// </summary>
   public String Greeting { get { return (String)GetPropertyValue(0); } }
   private HelloConfig( ) : base("Hello", ConfigContext.Current) { }
   public static String _ModuleSchema
   {
      get
      {
         return @"<?xml version="1.0" encoding="utf-8" ?>
<xsd:schema xmlns:xsd="http://www.w3.org/2001/XMLSchema"
xmlns="HelloConfig.xsd"
           targetNamespace="HelloConfig.xsd" elementFormDefault="qualified">
   <xsd:include schemaLocation=" " />
   <xsd:element name="Hello">
      <xsd:annotation>
         <xsd:documentation>Hello application configuration</xsd:documentation>
      </xsd:annotation>
      <xsd:complexType>
         <xsd:sequence>
            <xsd:element name="Greeting" type="String">
               <xsd:annotation>
                  <xsd:documentation>Greeting text</xsd:documentation>
               </xsd:annotation>
            </xsd:element>
         </xsd:sequence>
      <xsd:complexType>
   </xsd:element>
```

-continued

```
</xsd:schema>
";
      }
    }
  }
}
```

At block 508, the application that implements the configuration property (e.g., the Greeting property), is executed, an example of which is shown in the following example:

```
using System;
using System.Net;
using.Common.Config;
namespace.HelloApp
public class Hello
{
static void Main(string[ ] args)
{
   try
   {
      IPAddress   machineIP=Dns.Resolve(Dns.GetHost-
         Name( )).AddressList[0];
      //
      //Configuration initialization
      //ConfigContext.Initialize("HelloApp", new Version
         (1,0,0,0), false, "HelloAppConfig.xml");
      ConfigContext.RegisterConstantSelector("Machi-
         neIP", "IPAddress", machineIP);
      ConfigContext.Run( );
      //
      //Display greeting
      //
      Console.WriteLine(HelloConfig.Current.Greeting);
      //
      //Shutdown the configuration
      ConfigContext.Shutdown( );
   }
   catch (Exception e)
   {
      Console.WriteLine("ERROR:"+e);
   }
}
}
```

The Greeting property of this example, when executed, provides a different textual greeting for different types of machines. To accomplish this, groups of machines are defined in this example based on respective IP addresses. The following example illustrates a sample of how groups may be defined by using IP subnet definitions in a configuration file. The following sample also includes a default value ("Hello, World!") which is defined for instances in which the application is executed on an unknown machine. The HelloAppConfig.xml file is added to the application distribution as follows:

```
<?xml version="1.0" encoding="utf-8" ?>
<config xmlns="
<module>.HelloApp.HelloConfig, HelloApp</module>
<group name="HelloApp:LiveSite">
<documentation>Live site machines</documentation>
<query>
   <match    selector="MachineIP"    operator="In"
      valueType="IPSubnet">12.34.56.0::
      255.255.255.0</match>
</query>
</group>
<group name="HelloApp:DevMachines">
<documentation>Developer machines</documentation>
<query>
   <match    selector="MachineIP"    operator="In"
      valueType="IPSubnet">12.34.78.128::
      255.255.255.192</match>
</query>
</group>
<block>
<Hello>
   <Greeting>Hello, World!</Greeting>
</Hello>
</block>
<block group="HelloApp:LiveSite">
<Hello>
   <Greeting>Hello, Live Site!</Greeting>
</Hello>
</block>
<block group="HelloApp:DevMachines">
<Hello>
   <Greeting>Hello, Developers!</Greeting>
</Hello>
</block>
</config>
```

The above configuration file, when implemented by the configuration runtime, may be executed as follows. At block 512, a determination is made as to whether a machine is a member of a particular group in the configuration file, and if so, a corresponding action is performed for the particular group (block 514). For instance, the IP address for the machine that is executing the application may be compared with the IP addresses in each of the groups of the configuration file. If the IP address matches the IP address in the live site machines group, the greeting "Hello, Live Site!" from the corresponding block is output. Likewise, if the IP address matches the IP address in the DevMachines group, the greeting "Hello, Developers!" from the corresponding block of the configuration file is output.

If the machine is not a member of a particular group in the configuration file (block 512), a default action is performed (block 516). For instance, if the IP address for the machine that is executing the application does not match any of the IP addresses in each of the groups of the configuration file (i.e., the selectors do not satisfy the queries), the default greeting "Hello, World!" from the default block is output. In this way, the Greeting property provides a greeting regardless of whether the machine has an IP address that matches any of the IP address in the configuration file.

FIG. 6 is a flow diagram depicting a procedure 600 in an exemplary implementation in which the configuration runtime 126 of FIGS. 1 and 2 is executed to provide configuration data to the application built in FIG. 5. The configuration runtime provides configuration access to applications and is responsible for a variety of tasks, such as: (1) loading and verifying configuration files; (2) watching configuration files for changes and dynamically reloading configuration data from the configuration files when necessary; (3) handling the application's configuration selectors; (4) handling a configuration context for each application thread; (5) providing efficient data access and caching; and (6) other tasks that may be performed to provide configuration data to an application upon initialization and/or execution of the application. The configuration runtime, for example, may verify that configuration files referenced by an include directive are available and loaded properly, may verify that the configuration file contains each of the blocks for the corresponding groups, and so on. The configuration runtime may be implemented using managed code and support a managed application directly and/or support an unmanaged applications by exposing COMPONENT OBJECT MODEL (COM) interfaces, further discussion of which may be found in relation to FIGS. 8 and 9.

At block 602, execution of the application on a computing device is initiated. The application executes custom runtime code generated at block 504 of FIG. 5 to call a configuration property. In response to the call, the configuration system receives one or more selectors at an API (block 606). As previously described, selectors are special properties (settings) that are used by the configuration runtime as an input when determining which subset of the configuration data pertains to the execution context of the application. The selectors, for instance, may be used primarily when evaluating match expressions for the purpose of determining group membership.

Selectors may be divided into two categories. A first such category is constant. A constant selector, for instance, has a value which is set during application initialization and cannot change later (e.g., a host machine's IP address). This type of selector allows the configuration runtime to optimize data access by pre-selecting certain conditional data blocks identified as "constant" without having the re-evaluate conditional statements utilized to find matching selectors and criteria during the execution of the application. A second such category is variable. A variable selector has a value which can be changed by an application at any time, for any execution context (e.g., currently served user's domain name). In an implementation, each time a selector value changes, it may cause a current configuration context to re-compute its data set.

At block 608, the configuration runtime compares the one or more selectors with one or more criteria (i.e., queries) in one or more configuration files to find a match. In this way, the configuration runtime determines membership of the application in one or more groups defined in the one or more configuration files. For each match, the corresponding block of the group having the application as a member is loaded (block 610).

At block 612, the loaded configuration data is combined. In this implementation, if a configuration value appears in more than one of the blocks that are loaded (block 614), the values from the latter block override the configuration values of the prior block (block 616). For example, a particular configuration property may be referenced by multiple groups in a configuration file. The configuration property, however, may produce different values based on which group is utilized to choose the particular configuration property. For instance, the application may be a member of a network address group and a time-of-day group for the configuration property Hello. Membership of the application in the network address group provides a "Hello, World!" configuration value for the configuration property Hello. Membership of the application in the time-of-day group, however, may be utilized to provide a "Good Morning!" configuration value for the configuration property "Hello". In an implementation, the previously loaded configuration value is overwritten (i.e., replaced) with the latter configuration value based on the ordering of the blocks in the configuration file. At block 618, a communication is formed that contains the configuration values for communication to the application, thereby "insulating" the application from the configuration data.

FIG. 7 is an illustration showing a system 700 in an exemplary implementation in which an execution context is changed during the execution of the application 110 on the computing device 104(1). The previous implementation described the provision of configuration data from a configuration file during initiation of an application. Configuration data may also be provided dynamically during the execution of the application. For example, the application 110 may be configured as a server application that provides data to a plurality of other computing devices 104(4), 104(5) in FIG. 7. Each of the other computing devices 104(4), 104(5) has a respective thread in the execution of the application 110, which is illustrated respectively as application 110(4), 110(5). Each thread includes data associated with a single use of the application 110 which is utilized to serve a particular one of the computing devices 104(4), 104(5). Therefore, when a plurality of computing devices 104(4), 104(5) access the application 110, a thread (e.g., application 110(4), 110(5)) is created and maintained for each respective computing device 104(4), 104(5).

Each thread accesses the configuration data of the configuration files 206(g) through a respective configuration context object, which is illustrated in FIG. 7 as configuration context 206(4), 206(5) to depict correspondence of the respective configuration contexts 206(4), 206(5), threads (e.g., applications 110(4), 110(5)), and computing devices 104(4), 104(5), one to another. The configuration contexts 206(4), 206(5) are created transparently by the configuration runtime 126 each time the configuration system 120 is accessed by a new thread. The application, for example, may utilize the configuration contexts 206(4), 206(5) to set variable selector values for each of the threads, e.g. applications 110(4), 110(5), during the execution of the application 110. Thus, the configuration system 120 may be utilized to supply configuration data due to changing execution contexts of the application 110.

The application 110 may use the configuration context in a variety of other scenarios. For example, the application may use the configuration context once during initialization to register selectors and initialize a default configuration context. In another example, the application utilizes the configuration context once during shutdown to release allocated resources. If an error occurs during configuration access, the operation will throw an exception of type ConfigException, which may contain details that describe the error.

In an implementation, the configuration runtime 126 sets up one or more of a plurality of watchers 702(x), where "x" can be any integer from one to "X", to monitor the configuration files 216(g). Each watcher 702(x) may be implemented as a software module that monitors a respective one of the configuration files 216(g) during initialization of the configuration system 120, i.e. when the configuration system 120 is called by the application 110. Whenever any one of the configuration files 216(g) is modified, the watcher 702(x) causes the configuration runtime 126 is executed to reload the configuration data, such as by performing the procedure 600 of FIG. 6 to update the configuration data for the application 110. In an implementation, this update is performed transparently to the executing application 110. Should a new set of configuration data fail to load, the configuration runtime 126 will keep using the previously loaded configuration data and an error will be recorded in the application's 110 event log. To receive notifications on dynamic updates from the configuration runtime 126, the application 110 may register for a callback that will notify the application 110 each time configuration data is successfully reloaded.

Application Programming Interfaces

The configuration system exposes one or more application program interfaces (APIs) that can be called by an application to access configuration data. An API describes how requests of the configuration system by the application are to be made. In an embodiment, the APIs of the configuration system may be called by the application without having to "know" the details of how the configuration data was provided. The configuration system, therefore, may be implemented as a software layer which may be used as an infrastructure by the application to interact with the configuration data. The configuration system, for instance, may be utilized such that the application does not have to implement separate code for each execution context that may be encountered by the application, thereby programmatically "hiding" the details of the provision of configuration data to the application. APIs of the configuration system may be provided for applications that are implemented in managed or unmanaged code, examples of which are described in relation to the following figures.

Figure 8:
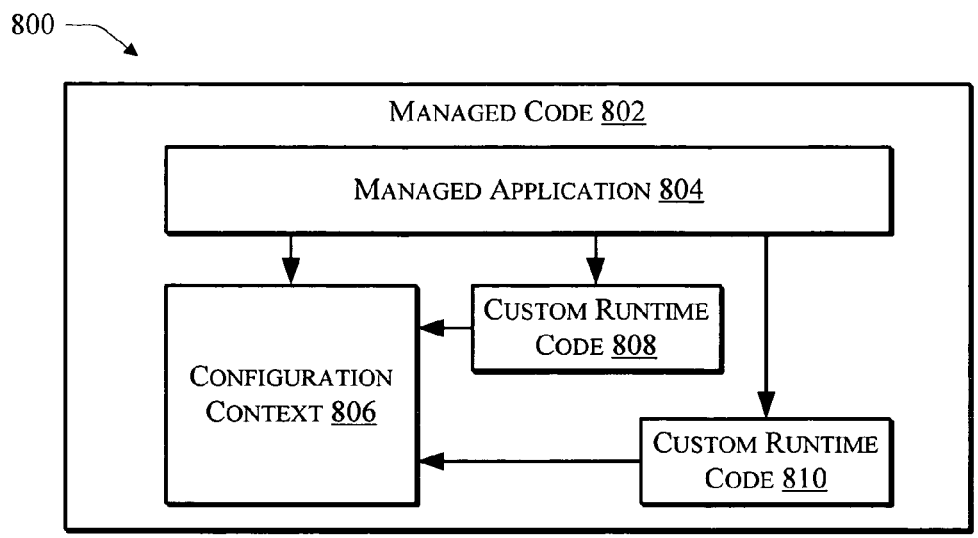
FIG. 8 is an illustration of an exemplary implementation showing a system that provides configuration data to an application implemented in managed code.

FIG. 8 is an illustration of an exemplary implementation showing a system 800 that provides configuration data to an application implemented in managed code. Code executed through the use of a runtime agent (e.g., the configuration runtime 126) may be referred to as managed code 802. Managed code 802 provides core services, such as memory management, thread management, remoting, enforcing strict type safety in the code, and so on. Thus, code that targets the runtime agent is known as managed code, and code that does not target the runtime agent is known as unmanaged code, further discussion of unmanaged code may be found in relation to FIG. 9.

A managed application 804, for instance, may access configuration data 122(m) of FIG. 2 directly using a configuration context 806 and generated custom runtime code 808, 810. As previously described in relation to FIGS. 2 and 7, the configuration context 806 is created independently for each application thread that is executed. For example, the application 110 of FIG. 2 may be configured as a server application for access by a plurality of users. A thread is created for each user having data that describes that user's context. In the illustrated system 800, the managed application 804, configuration context 806, and custom runtime code 808, 810 are each implemented through use of managed code 802.

Figure 9:
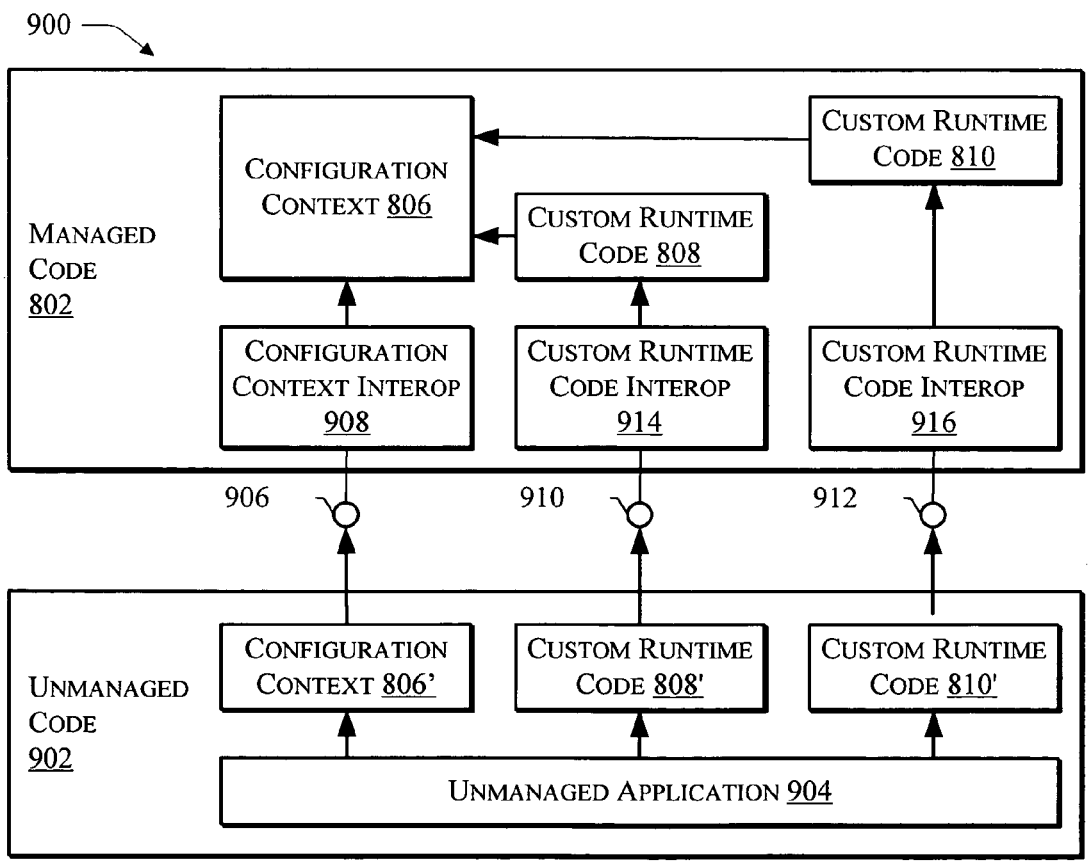
FIG. 9 is an illustration of an exemplary implementation showing a system that provides configuration data to an application implemented in unmanaged code.

FIG. 9 is an illustration of an exemplary implementation showing a system 900 that provides configuration data to unmanaged code 902 implementing an unmanaged application 904. Like the system 800 of FIG. 8, the system 900 of FIG. 9 provides the configuration system through use of managed code. The configuration context 806 and generated custom runtime code 808, 810 are utilized to access configuration data 122(m) of FIG. 1. In this instance, however, the unmanaged application 904 is implemented using unmanaged code 902. Therefore, the system 900 includes both managed and unmanaged code 802, 902.

The unmanaged application 904 accesses configuration data 122(m) of FIG. 1 by using automatically generated component object model (COM) interfaces and unmanaged proxy objects. COM is a binary standard that provides code interaction by creating objects having callable methods. COM objects are utilized to transparently handle the "details" of method calls, such as between processes on a same address space, between address spaces of a singe computing device, and between separate computing devices. For example, the unmanaged application 904 may utilize proxy objects, which are denoted as a configuration context 806', a custom runtime code 808', and a custom runtime code 810' to indicate that each of the proxy objects correspond, respectively to the configuration context 806, the custom runtime code 808, and the custom runtime code 810. The proxy objects are "stubs" which may be used to manipulate a "real" object that is located elsewhere, which in this instance is located in the managed code 802.

Each of the proxy objects is configured to forward method calls, retrieve the results, and present the results to the unmanaged application 904. For instance, unmanaged application 904 may call configuration context 806' without "knowing" that the configuration context 806' is a proxy object. The configuration context 806' (i.e., proxy object) forwards the call over an interface 906 of the configuration context COM object, which is illustrated in FIG. 9 as "configuration context interop 908". The interface 906 may be thought of as a group of methods, i.e. functions, which are callable via the proxy object (e.g., configuration context 806'). The configuration context COM object (i.e., configuration context interop 908) then forwards the call to the configuration context 806.

Communication from the configuration context to the unmanaged application may be performed similarly through use of the configuration context COM object (i.e., configuration context interop 908), interface 906, and proxy object (i.e., configuration context 806'). Likewise, the proxy objects (i.e., custom runtime code 808', 810') forward calls over respective interfaces 910, 912 of respective configuration context COM objects, which are illustrated respectively in FIG. 9 by custom runtime code interop 914, 916. The custom runtime code interop 914, 916 are configured to forward calls to respective custom runtime code 808, 810, which forward the calls to the configuration context 806. Through use of the proxy and COM objects, the unmanaged application 904 may retrieve configuration data through the configuration context 806 implemented in managed code 802.

As shown in FIGS. 8 and 9, the access of configuration data for managed and unmanaged applications differs, one to another. The following sections provide configuration access code samples for both cases, in which C# is discussed as an example of managed code and C++ is discussed as an example of unmanaged code. Although C# and C++ are discussed as examples of managed and unmanaged code, respectively, a variety of the managed and/or managed codes may be utilized.

The configuration compiler, as previously described, may be implemented as a command line tool that is used during application build process. The configuration compiler accepts a module schema file as an input and produces one or two source code files, which may be represented as follows:

ConfigCompiler    xsdModuleSchemaFile    className
        csSourceCodeFile [hSourceCodeFile]

In the above example, csSourceCodeFile may contain C# managed configuration access source code for the module. Optionally, applications that require configuration access from unmanaged environments may specify a C++ header file hSourceCodeFile, which will cause the configuration compiler to generate unmanaged configuration access source code and COM managed-to-unmanaged interfaces.

The generated code contains a class to be used to access the configuration module's data by an application. This class also contains a copy of module's schema, which is used by the configuration runtime.

Module

A module may be represented by a C# public class, as specified in the module schema file that follows:

```
public sealed class AbcConfig
{
public static AbcConfig Current {get;}
config items
}
```

To access configuration, an application first calls a static property Current to obtain an instance of the module class for the current thread's configuration context. The module's items may then be accessed as properties of the object. In an implementation, each configuration module's item is represented as a single public C# property with the name as defined in the schema.

For unmanaged applications, the C++ module access class is slightly different, which may be represented as follows:

```
class AbcConfig
{
public:
AbcConfig( );
config items
};
```

There are two differences when comparing the unmanaged code with managed code that are shown in the previous examples. First, the application creates an instance of the module class explicitly (e.g., there is no Current property). Second, the module's items are represented as functions because there is no concept of a property in C++.

Properties

Single properties are generated as items that return a type as defined in the module's schema. In an implementation, the properties are guaranteed to return a valid value. For example, a string property Foo will have the following code generated:

```
<Abc>
<Foo>xyz</Foo>
</Abc>
```

Managed generated code may be represented as follows:

```
public sealed class AbcConfig
{
public String Foo {get;}
}
```

Unmanaged generated code is represented as follows:

```
class AbcConfig
{
public:
ConfigString Foo( );
}
```

Collections

Collections are generated as nested classes that mirror the data hierarchy of the configuration module. For example, the Foo property may be put inside a collection De to see the generated access code and its use by an application:

```
<Abc>
<De>
<Foo>xyz</Foo>
</De>
</Abc>
```

Managed generated code for the Foo property may be represented as follows:

```
public sealed class AbcConfig
{
public class Coll_De
{
   public String Foo {get;}
}
public Coll_De De {get;}
}
```

Managed application sample usage of the Foo property is represented as follows:

```
AbcConfig config=AbcConfig.Current;
String foo=config.De.Foo;
```

On the contrary, unmanaged generated code for the Foo property may be represented as follows:

```
class AbcConfig
{
public:
class Coll_De
{
public:
   ConfigString Foo( );
};
Coll_De De( );
};
```

Unmanaged application sample usage of the Foo property is represented as follows:

```
std::wstring foo;
AbcConfig config;
foo=config.De( )Foo( );
```

Property Lists

Property lists are accessed through a special class that provides an array-like interface. For example, the Foo property may be made into a list as follows:

```
<Abc>
<Foo>x<Foo>
<Foo>y</Foo>
<Foo>z</Foo>
</Abc>
```

Managed generated code for the Foo property list may be represented as follows:

```
public sealed class AbcConfig
{
public class PropList_Foo
{
   public Int32 Count {get;}
   public String this[Int32 idx] {get;}
   public ICollection Values {get;}
}
public PropList_Foo Foo {get;}
}
```

Managed application sample usage for the Foo property list may be represented as follows:

```
AbcConfig config=AbcConfig.Current;
Int32 count=config.Foo.Count;
String[ ] x=new String[count];
for (Int32 i=0; i<count; ++i)
{
x[i]=config.Foo[i];
}
```

On the other hand, unmanaged generated code for the Foo property list may be represented as follows:

```
class AbcConfig
{
public:
class PropList_Foo
{
public:
   int Count( );
   ConfigString operator[ ](int idx);
},
PropList_Foo Foo( );
};
```

Unmanaged application for the Foo property list may be represented as follows:
```
AbcConfig config;
int count=config.Foo( )Count( );
std::vector<std::wstring>x(count);
for (int i=0; i<count; ++i)
{
x[i]=config.Foo( )[i];
}
```
Collection Lists Collection lists are handled in the similar way as the property lists previously described, as shown in the following example:
```
<Abc>
  <De>
    <Foo>x</Foo>
  </De>
  <De>
    <Foo>y</Foo>
  </De>
  <De>
    <Foo>z</Foo>
  </De>
</Abc>
```
Managed generated code for the collection list may be represented as follows:
```
public sealed class AbcConfig
{
  public class Coll_De
  {
    public String Foo {get;}
  }
  public class CollList_De
  {
    public Int32 Count {get;}
    public Coll_De this[Int32 idx] {get;}
    public ICollection Values {get;}
  }
  public CollList_De De {get;}
}
```
Managed application sample usage for the collection list may be represented as follows:
```
AbcConfig config=AbcConfig.Current;
Int32 count=config.De.Count;
String[ ] x=new String[count];
for (Int32 i=0; i<count; ++i)
{
x[i]=config.De[i].Foo;
}
```
Unmanaged generated code for the collection list may be represented as follows:
```
class AbcConfig
{
public:
class Coll_De
{
public:
  ConfigString Foo( );
};
class CollList_De
{
public:
  int Count( );
  Coll_De operator[ ](int idx);
};
CollList_De De( );
};
```

Unmanaged application sample usage for the collection list may be represented as follows:
```
AbcConfig config;
int count=config.De( )Count( );
std::vector<std::wstring>x(count);
for (int i=0; i<count; ++i)
{
x[i]=config.De( )[i].Foo( );
}
```
Property Dictionaries Property dictionaries, similarly to lists, are accessed through a special class that provides a dictionary-like interface. For example, Foo may be defined as a property dictionary with a string key named id and value of type Guid, which may be represented as follows:
```
<Abc>
  <Foo id="lmn">771B55FD-EDOE-4de5-8D14-85A73BF9F9F6</Foo>
  <Foo id="opq">975910CE-709F-4905-A86B-6EBCF5E68736</Foo>
  <Foo id="rst">4D72442B-2F8E-435a-A2BB-936649811223</Foo>
</Abc>
```
Managed generated code for the Foo property dictionary may be represented as follows:
```
public sealed class AbcConfig
{
public class PropDict_Foo
{
  public Int32 Count {get;}
  public Guid this[String key] {get;}
  public String GetKey(Int32 idx);
  public Int32 IndexOf(String key);
  public Guid GetByIndex(Int32 idx);
  public ICollection Keys {get;}
  public ICollection Values {get;}
}
public PropDict_Foo Foo {get;}
}
```
Managed application sample usage for the Foo property dictionary may be represented as follows:
```
AbcConfig config=AbcConfig.Current;
Guid guid=config.Foo["lmn"];
```
On the contrary, unmanaged generated code for the Foo property dictionary may be represented as follows:
```
class AbcConfig
{
public:
class PropDict_Foo
{
public:
  int Count( );
  GUID operator[ ](ConfigString key);
  ConfigString GetKey(int idx);
  int IndexOf(ConfigString key);
  GUID GetByIndex(int idx);
};
PropList_Foo Foo( );
};
```
Unmanaged application sample usage for the Foo property dictionary may be represented as follows:
```
AbcConfig config;
GUID guid=config.Foo( )["lmn"];
```
Collection Dictionaries Collection dictionaries are also handled in the similar way as property dictionaries that were previously described, as shown in the following example:

```
<Abc>
<De id="lmn">
<Foo>771B55FD-EDOE-4de5-8D14-85A73BF9F9F6</Foo>
</De>
<De id="opq">
<Foo>975910CE-709F-4905-A86B-6EBCF5E68736</Foo>
</De>
<De id="rst">
<Foo>4D72442B-2F8E-435a-A2BB-936649811223</Foo>
</De>
</Abc>
```

Managed generated code for the Foo collection dictionary may be represented as follows:

```
public sealed class AbcConfig
{
public class Coll_De
{
public Guid Foo {get;}
}
public class CollDict_De
{
public Int32 Count {get;}
public Coll_De this[String key] {get;}
public String GetKey(Int32 idx);
public Int32 IndexOf(String key);
public Coll_De GetByIndex(Int32 idx);
public ICollection Keys {get;}
public ICollection Values {get;}
}
public CollDict_De De {get;}
}
```

Managed application sample usage for the Foo collection dictionary may be represented as follows::

```
AbcConfig config=AbcConfig.Current;
Guid guid=config.De["lmn"].Foo;
```

Unmanaged generated code for the Foo collection dictionary may be represented as follows::

```
class AbcConfig
{
public:
class Coll_De
{
public:
GUID Foo( );
};
class CollDict_De
{
public:
int Count( );
Coll_De operator[ ](ConfigString key);
ConfigString GetKey(int idx);
int IndexOf(ConfigString key);
Coll_De GetByIndex(int idx);
};
CollDict_De De( );
};
```

Unmanaged application sample usage for the Foo collection dictionary may be represented as follows::

```
AbcConfig config;
GUID guid=config.De( )["lmn"].Foo( );
```

Although the previous discussion described C# as an example of managed code and C++ as an example of unmanaged code, a variety of other managed and unmanaged codes may be utilized to implemented the configuration system as previously described.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   ascertaining a selector for an application during execution of the application, the selector specifying a property of an execution context for the application;
   providing the ascertained selector from the application to a configuration system via an application programming interface (API);
   providing a directory that includes a plurality groups, each of the groups including (1) a block that stores configuration data and (2) one or more criteria that determine whether the application qualifies as a member in the corresponding group, wherein the plurality of criteria for application membership comprise:
   an IP address of a computing device that executes the application;
   an application build type;
   an application version indicator; and
   a user domain;
   and
   determining whether the application qualifies as a member in one or more groups by finding a match between the selector and the one or more criteria of the one or more groups;
   loading the configuration data in the block of each group that the application qualifies as a member when one or more matches are found;
   creating a module containing at least one configuration property of the loaded configuration data from the block of each group that the application qualifies as the member;
   generating custom runtime source code from the module through execution of a configuration compiler and integrating the custom runtime source code into the application during a build of the application such that the application may access the at least one configuration property following the build; and
   executing the application using the loaded configuration data.

2. The method as described in claim 1, wherein the selector is a constant such that a value of the selector does not change during an execution of the application.

3. The method as described in claim 1, wherein the selector is a variable such that a value of the selector is configured to change during an execution of the application.

4. The method as described in claim 1, wherein the property of the execution context is a software property of the computing device that executes the application.

5. The method as described in claim 1, wherein the configuration system is implemented in managed code and the application is implemented in unmanaged code.

6. The method as described in claim 1, further comprising examining the loaded configuration data to establish if the configuration data has been modified and if so, performing the determining and the loading.

7. The method as described in claim 6, wherein the ascertaining is performed during an execution of the application on the computing device.

8. The method as described in claim 1, further comprising loading default configuration data having one or more default values when the selector does not match the criteria of the plurality of groups.

9. The method as described in claim 1, wherein the configuration system and the application are implemented in managed code.

10. The method as described in claim 1, wherein the configuration system exposes one or more component object model (COM) interfaces that are callable by the application for accessing the configuration data.

11. One or more computer readable storage media comprising computer executable instructions that when executed on a computer direct the computer to perform the method of claim 1.

12. A method for executing an application on a computing device, comprising:
   storing a plurality of criteria of a configuration file for executing the application in various execution contexts into groups, wherein each group includes at least one of the criteria, the configuration file further including a plurality of blocks, each block being associated with a corresponding group of one or more criteria and containing a subset of configuration data for executing the application in a different execution context;
   creating a configuration module that includes the subset of configuration data for executing the application in one of the various execution contexts from one of the plurality of blocks;
   executing a configuration compiler to generate a runtime code for the configuration module and integrating the generated runtime code into the application;
   receiving a selector at an application programming interface (API) that specifies the at least one property of an execution context of the application when the application executes the integrated runtime code;
   comparing the selector with the plurality of criteria to find a matching group of one or more criteria;
   loading a block that is associated with the matching group to obtain the corresponding subset of configuration data;
   forming a communication to the application that includes the obtained subset of the configuration data; and
   executing the application using the obtained subset of the configuration data.

13. The method as described in claim 12, wherein the at least one property of the execution context is selected from one or more properties of the matching group consisting of:
   a hardware property of the computing device that executes the application;
   a software property of the computing device that executes the application;
   a network property of the computing device that executes the application;
   a network property of a computing that is communicatively coupled to a computing device that executes the application;
   a hardware property of another computing device that is communicatively coupled to the computing device that executes the application; and
   a software property of another computing device that is communicatively coupled to the computing device that executes the application.

14. The method as described in claim 12, further comprising forming another communication to the application that includes default configuration data when the selector does not match any of the groups.

15. The method as described in claim 12, wherein the receiving, the comparing, the loading, and the forming are performed through execution of a configuration system.

16. The method as described in claim 15, wherein the configuration system is implemented in managed code and the application is implemented in unmanaged code.

17. The method as described in claim 15, wherein the configuration system exposes one or more component object model (COM) interfaces that are callable by the application for accessing the configuration data.

18. The method as described in of claim 15, wherein the configuration system and the application are implemented in managed code.

19. The method as described in claim 12, wherein the selector is a constant such that a value of the selector does not change during the execution of the application.

20. The method as described in claim 12, wherein the selector is a variable such that a value of the selector may change during the execution of the application.

21. One or more computer readable storage media comprising computer executable instructions that when executed on a computer direct the computer to perform the method of claim 12.

22. A method comprising:
   arranging configuration data into a plurality of groups and a plurality of blocks, each group having a plurality of criteria for membership by an application, wherein the plurality of criteria for membership comprises:
   an IP address of a computing device that executes the application;
   a build type of the application;
   a version indicator of the application; and
   a user domain; and
   each group has a corresponding block that includes a subset of the configuration data;
   creating a configuration module that includes the configuration data in one of the plurality of blocks;
   generating custom runtime source code based on the configuration module and integrating the runtime source code into the application during a build of the application such that the application is configured to access the configuration data following the build by supplying a selector via an application program interface (API) for comparison with the plurality of criteria of each group to locate one or more blocks that match the selector and having one or more corresponding subsets of the configuration data for the application and load the one or more blocks that match the selector; and
   executing the application using the one or more loaded blocks.

23. The method as described in claim 22, wherein the selector includes a property of an execution context of the application that is selected from one or more of the group consisting of:
   a hardware property of a computing device that executes the application;
   a software property of a computing device that executes the application;
   a network property of a computing device that executes the application;
   a network property of a computing that is communicatively coupled to a computing device that executes the application;

a hardware property of a computing device that is communicatively coupled to a computing device that executes the application; and a software property of a computing device that is communicatively coupled to a computing device that executes the application.

24. The method as described in claim 22, wherein the configuration system and the application are implemented in managed code.

25. The method as described in claim 22, wherein the configuration system is implemented in managed code and the application is implemented in unmanaged code.

26. One or more computer readable storage media comprising computer executable instructions that when executed on a computer direct the computer to perform the method of claim 22.

27. A computing device comprising:

a processor; and memory configured to maintain:

an application that is executable on the processor to provide a plurality of threads, wherein each thread, when executed, includes data associated with a single execution of the application;

one or more configuration files that contain configuration data for use during an execution of each thread, the configuration data in each configuration file being organized into blocks in which each block is associated with a criterion and contains a subset of the configuration data;

a configuration system that is executable on the processor to perform acts that include locating one or more blocks each having a subset of the configuration data for use by a particular thread by comparing a property of an execution context of the particular thread with each criterion, and loading a subset of the configuration data from each block with the criterion that matches the property to obtain a combined subset of configuration data, wherein the loading includes override a first non-default value of a configuration property that is in a prior block with a second non-default value of the configuration property from a latter block based on an ordering of the plurality of blocks in the corresponding configuration file;

wherein the application is executable to call the configuration system to provide the property of the execution context of the particular thread; and executing the application using the loaded configuration data.

28. A computing device as described in claim 27, wherein the configuration system is executable on the processor to monitor the execution of the particular thread to determine the property.

29. A computing device as described in claim 27, wherein the configuration system is executable on the processor to obtain default configuration data when the property of the execution context of the particular thread does not match the one or more criteria.

30. A computing device as described in claim 27, wherein the application is a web application that is executable on the processor to provide a web page in response to a request, and each request is assigned a corresponding thread.

31. A computing device as described in claim 27, wherein the configuration system is implemented in managed code and the application is implemented in unmanaged code.

32. A computing device as described in claim 27, wherein the configuration system exposes one or more Component Object Model (COM) interfaces that are callable by the application for accessing the configuration data.

33. A computing device as described in claim 27, wherein the configuration system and the application are implemented in managed code.

34. A computing device as described in claim 27, wherein the property of an execution context of the particular thread is selected from one or more of the group consisting of:

a hardware property of a computing device that executes the application;

a software property of a computing device that executes the application;

a network property of a computing device that executes the application;

a network property of a computing that is communicatively coupled to a computing device that executes the application;

a hardware property of a computing device that is communicatively coupled to a computing device that executes the application; and a software property of a computing device that is communicatively coupled to a computing device that executes the application.

* * * * *